UNITED STATES PATENT OFFICE.

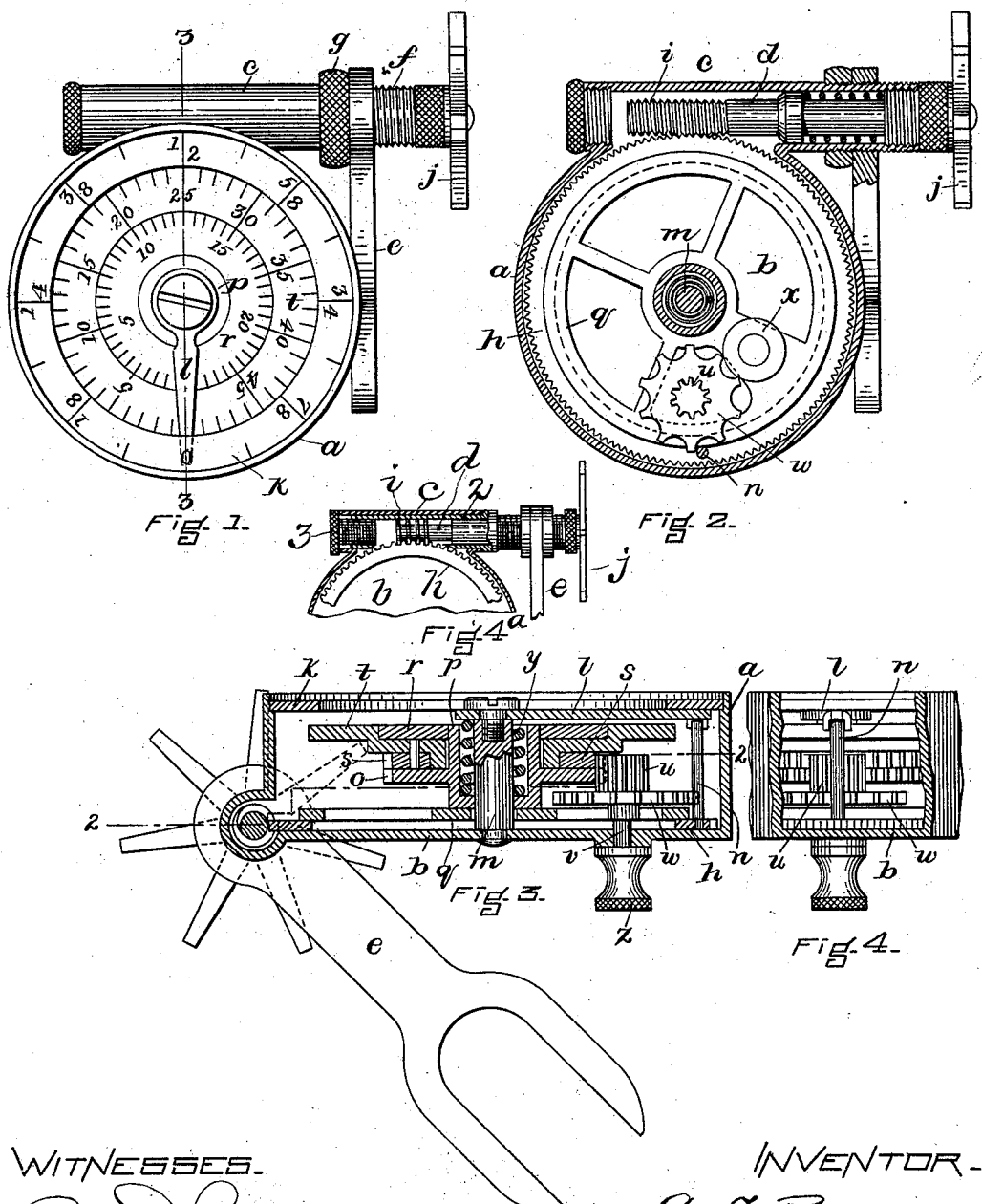

ALBERT F. ROCKWELL, OF BRISTOL, CONNECTICUT, ASSIGNOR TO THE NEW DEPARTURE BELL COMPANY, OF SAME PLACE.

CYCLOMETER.

SPECIFICATION forming part of Letters Patent No. 565,034, dated August 4, 1896.

Application filed September 30, 1895. Serial No. 564,234. (No model.)

*To all whom it may concern:*

Be it known that I, ALBERT F. ROCKWELL, of Bristol, in the county of Hartford and State of Connecticut, have invented certain new and useful Improvements in Cyclometers, of which the following is a specification.

This invention has relation generally to instruments or devices for recording or indicating the number of revolutions of a wheel, and has special reference to "cyclometers," so called, for recording the distance traveled by a vehicle, such as a velocipede, bicycle, carriage, and the like.

It is the general object of the invention to provide a cyclometer which shall to a maximum degree combine certainty and accuracy of operation with simplicity of construction and wide range of recording or indicating functions.

The invention embraces improvements in the means for indicating or recording fractions, units, and tens or a multiple of tens of miles traveled by a vehicle-wheel.

The invention also embraces improved means for operating the indicating mechanism of a cyclometer from a moving wheel, as also improved means for setting back the indicating or recording means to zero or other desired starting-point, all as I will now proceed to describe in detail, and point out in the appended claims.

Reference is to be had to the annexed drawings, and to the letters and figures marked thereon, forming a part of this specification, the same letters and figures designating the same parts or features, as the case may be wherever they occur.

Of the drawings, Figure 1 is a plan view of my improved cyclometer, the indicators being set at zero, or the usual point of starting in the use of the instrument. Fig. 2 is a horizontal sectional view taken on the line 2 2 of Fig. 3. Fig. 3 is a vertical sectional view taken on the line 3 3 of Fig. 1. Fig. 4 is a sectional detail view, in side elevation, looking against the adjacent or opposing side of the instrument as represented in Fig. 3. Fig. 4ª is a sectional plan view of a part of the invention, illustrating a modification.

In the drawings, $a$ designates the cylindrical casing in which the indicating or recording mechanism is confined, and which casing is provided with a bottom or base-plate $b$ and may have, if desired, a face-covering of glass. (Not shown.)

Integral with or secured to the casing $a$ is a tubular bracket $c$, forming a bearing or support for the worm-shaft $d$, and affording a means for connecting the attaching-arm $e$ to the casing and adjusting the instrument with respect to the attaching-arm. In the present case the tubular bracket $c$ is externally screw-threaded, as at $f$, and the connecting end of the arm $e$ is turned on the said screw-threaded part, as shown in Figs. 1 and 2, which construction and arrangement afford a desirable means of adjustment of the instrument, as aforesaid. A jam or set nut $g$ may be employed in this connection for maintaining the cyclometer in adjusted position.

$h$ is a worm gear or ring which rests loosely upon the base-plate or bottom $b$ and extends to the entire interior circumference of the casing $c$, as shown. The worm $i$ of the worm-shaft $d$ engages the worm-ring $h$, so that when one of the radial arms or spokes of the star-wheel $j$ on the outer end of the worm-shaft is engaged by suitable means on the vehicle-wheel to turn the said star-wheel and shaft the worm gear or ring $h$ will be turned in time and extent accordingly, all as will be readily understood without further description.

The means shown in the drawings, or any other suitable for the purpose, may be employed for maintaining the worm-shaft in proper relationship to the worm-ring.

$k$ is a fixed ring-dial secured to the face or upper edge of the casing $a$, and is scaled or marked to fractions of, say, a mile.

$l$ is a pointer or hand arranged at its inner end to turn upon a stud $m$, extending up from the base-plate $b$, and connected at its outer or free end through the medium of a pin $n$ with the loose worm-ring $h$. (See particularly Figs. 3 and 4.) Under this construction and arrangement it will be seen that as the worm-shaft $d$ is turned intermittingly, as it is designed to be, by engagement of means on the vehicle-wheel with the spokes or arms of the star-wheel $j$, the worm-ring $h$ will be rotated, and it will through the means of the pin $n$ carry the pointer or hand $l$ around with it, and as one mile of travel of the vehicle-wheel may be supposed to impart one complete rotary movement to the worm-ring $h$ the pointer $l$ will accurately indicate in connection with the dial $k$ when a mile of travel has been completed, or the fractional part of a mile which may have been traversed.

$o$ is a toothed wheel provided with a hub or sleeve $p$, loosely surrounding the shaft $m$, so that the said wheel $o$ may turn upon the said shaft.

$q$ is a smooth wheel or ring which turns upon the shaft $m$ and rests upon the worm ring or wheel $h$, the lower end or part of the hub $p$ of the gear $o$ in turn resting upon the smooth ring $q$.

The upper end of the hub $p$ is provided with a dial $r$, scaled to tens, or it may be a multiple of tens of miles or revolutions of the worm gear or ring $h$.

$s$ designates a gear-wheel equal in diameter to the gear-wheel $o$, and arranged to rest thereon, as shown. This gear-wheel $s$ has pinned or otherwise secured to it a dial $t$, which is arranged outside of and in the same plane horizontally with the dial $r$, the dials $k\ r\ t$ when viewed in plan or from above showing a complete covering to the device.

The dial $t$ is scaled or marked to units of miles or so as to indicate or record with reference to the scale inscribed on the dial $k$ the number of revolutions of the worm-ring $h$ from "one" to "fifty."

$u$ is a pinion secured to the inner end of a stud $v$, having bearings in the base-plate $b$, which pinion engages the teeth of the gears $o\ s$, and $w$ is a star-wheel connected with the stud $v$ below the pinion $u$, and so positioned and related to the parts that at each rotation of the worm ring or gear $h$ the pin $n$, connecting the worm-gear with the pointer $l$, will come into contact with one of the teeth or cogs of the said star-wheel $w$ and move it to the extent of one tooth, and consequently move the gears $o\ s$ through the medium of the pinion $u$ to the same extent.

$x$ is a roller mounted on a stud extending up from the smooth ring or wheel $q$, and arranged so as to rest between two teeth or cogs of the star-wheel $w$ and hold the same against accidental turning, and so as that the pin $n$ may properly engage the teeth of the said star-wheel and turn it only to the desired extent.

A spring $y$, surrounding the shaft or stud $m$ within the sleeve $p$, and bearing at its upper end against the finger $l$ or other suitable part of the instrument and at its lower end upon the said sleeve or hub $p$ or other part of the gear $o$, serves to frictionally hold together and in proper relative position worm-gear $h$, ring $q$, and gears $o\ s$; and as the worm ring or gear $h$ will be moved in a direction to frictionally carry with it the smooth ring $q$ in a direction to cause the roller $x$ to bear against the star-wheel $w$, said roller will be kept up to place between the teeth or cogs of the said star-wheel, though it will be allowed to yield backward to permit the star-wheel to turn to the extent of one tooth, or so that the dial may be reset, as will presently be explained.

It will be understood that the dials $t\ r$ are scaled in accordance with the number of their respective gear-wheels $o\ s$, and as the gear-wheel $o$ has one less in number of teeth than the gear-wheel $s$, it follows that when the latter wheel has been given one complete rotation the former will have fallen short to the extent of one tooth of a complete rotation, so that the scale-marks on the dials $t\ r$ will have been moved out of register or matched relationship to the extent of one scale-mark. Now, as the instrument is herein shown to be organized and the dials to be scaled, at every fifty revolutions of the worm-ring $h$ and pointer $l$ the gear $s$ and its dial $t$ will be moved to the extent of one rotation, indicating fifty miles of travel of the vehicle-wheel (not shown) which operates the star-wheel $j$, and as at each rotation of the gear-wheel $s$ and its dial $t$ the gear-wheel $o$ and its dial $r$ will have changed position or relationship to the extent of one tooth and scale-mark, the dial $r$ with respect to the dial $t$ will accurately indicate the number of fifty miles traveled by the vehicle-wheel. Thus we have the pointer $l$ indicating on the outer dial $k$ the fractions of a mile traveled, the next inner dial $t$ indicating with reference to the zero-mark on the dial $k$ the units of miles traveled from one to fifty, and the dial $r$ in its relationship to the scale on the dial $t$ indicating the number of miles by fifties that the operating vehicle-wheel has traveled.

$z$ is a thumb-knob on the lower or outer end of the stud $v$, so that the user of the instrument, when it is desired to set the dials $r\ t$ at zero, may take hold of said knob and turn the dial gear-wheels back through the medium of the pinion $u$, the roller $n$ and smooth wheel yielding back, so as to allow the star-wheel $m$ to turn with the stud $v$ and pinion $u$, the pointer $l$ being set back or turned to zero by rotating the star-wheel $j$ and worm-shaft $d$, all as will be readily understood.

The advantages of my improved cyclometer over those commonly employed will be obvious to those skilled in the art without further description or explanation. It may be mentioned, however, that while I secure certainty and accuracy in the operation of the instrument, and a ready setback of the dials to normal or zero position, I attain these ends with an exceedingly small number of parts, and at the same time obtain a high number in registration or indication of rotation of the vehicle or other prime operating wheel.

Of course the several parts may be geared in different time from that shown and described, in which case the dials will be scaled or inscribed accordingly; and it will be observed that any means connecting the worm-gear $h$ with the pointer $l$ which will accomplish substantially the same result may be adopted without departing from the nature or spirit of my invention.

In Fig. 4ª there is shown a modified form of the manner of supporting the worm-shaft $d$ in its bearings so as to have it engage with the worm-ring $h$. In this modified form of the device the purpose is to make the worm-shaft adjustable in the bracket $c$, so that it might extend from the said bracket at either end—that is, so as to make it, as it were, a right or a left hand device. The only difference between this structure and that previously described is that the worm-shaft is supported in a sleeve 2, which is inserted in the tubular bracket $c$ from either end of said bracket. 3 designates the screw-plug tapped into the end of the bracket $c$, or it may be a tubular bearing or sleeve 2, so as to close the end opposite that at which the star-wheel $j$ is applied to the worm-shaft. It will be understood from an inspection of this figure that the screw-plug 3 may be turned out from its place and the worm-shaft and its sleeve-support 2 drawn out and inserted in the end from which the screw-plug was removed, and then the screw-plug turned in on the end from which the supported star-wheel extended. This modified construction is provided in order that the invention may be applicable to bicycles on one side of the wheel or the other—that is, as before stated, to make them either rights or lefts.

Having thus explained the nature of the invention and described a way of constructing and using the same, though without attempting to set forth all of the forms in which it may be made or all of the modes of its use, it is declared that what is claimed is—

1. A cyclometer embodying in its construction, a casing, a fixed dial, a worm gear or ring supported in the casing, a rotary pointer connected with the worm-ring, and two differentially-movable dials operated by the worm-ring.

2. A cyclometer embodying in its construction, a casing, a fixed dial, a worm-gear supported in the casing, a pointer connected with the worm-gear to revolve therewith, two rotary dials, differential gearing for rotating said rotary dials, and a pinion operated by the worm-gear for engaging and moving the differential gearing.

3. A cyclometer embodying in its construction, two dials, a gear-wheel connected with each of the said dials a common pinion engaging the said gear-wheel to move the same, means for operating the said pinion, a star-wheel connected with said pinion, and a yielding stop engaging the said star-wheel.

4. In a cyclometer the combination, with the casing, of a loose worm-ring supported in said casing, a worm engaging and operating the said ring, a loose ring frictionally supported on the worm-ring and provided with a stop, dials and differential gearing for operating the same, a pinion for engaging and moving the said differential gearing, and a star-wheel connected with the said pinion and with which the said stop is adapted to come into engagement.

5. In a cyclometer, the combination with the casing, the fixed dial, the rotary pointer, and the rotary dials, of a worm-ring for operating the pointer and the rotary dials, and a loose ring or wheel for holding the worm-ring in place.

6. In a cyclometer, the combination with the casing, a fixed dial, a central stud, a rotary pointer having its inner end mounted on said stud, a worm-ring supported in the casing concentrically of the stud, and a pin connecting the worm-ring with the outer free end of the pointer, of a rotary dial mounted concentrically of the stud, and a gear-wheel mounted on the casing eccentrically of said stud, for moving the rotary dial, said gear-wheel being operated intermittingly by said pin.

7. In a cyclometer, the combination with the casing, a fixed dial, a rotary pointer, a worm-ring connected with the pointer, and two differentially-movable dials, of a gear-wheel operated by the worm-ring for moving the last said dials, a stud on which the said gear-wheel is mounted and projecting through the casing, and a thumb-knob on the projecting end of said stud.

8. In a cyclometer, the combination with the differentially-movable dials and their gearing, a pinion engaging the said gearing, a yielding stop for holding the said pinion in place, and means for moving back the said pinion, gearing and dials against the force of the said stop.

9. A cyclometer comprising in its construction a fixed dial, a revoluble pointer indicating fractions of a mile, means for revolving said pointer, two differently-speeded gear-wheels having dials marked to indicate a certain number of miles and multiples thereof respectively, and a pinion operated by the pointer-revolving means, intermeshing with said differently-speeded gear-wheels, substantially as set forth.

In testimony whereof I have signed my name to this specification, in the presence of two subscribing witnesses, this 8th day of August, A. D. 1895.

ALBERT F. ROCKWELL.

Witnesses:
ROGER S. NEWELL,
JOHN J. JENNINGS.